United States Patent

Wang

[11] Patent Number: 5,287,052
[45] Date of Patent: Feb. 15, 1994

[54] SIZE ADJUSTABLE BATTERY CHARGER

[76] Inventor: Fu C. Wang, 2F., No. 10, Alley 5, Lane 220, Wen Der Road, Taipei, Taiwan

[21] Appl. No.: 41,777

[22] Filed: Apr. 2, 1993

[30] Foreign Application Priority Data

Sep. 1, 1992 [CN] China .................................. 92232503

[51] Int. Cl.⁵ .............................................. H02J 7/00
[52] U.S. Cl. ........................................... 320/2; 320/15
[58] Field of Search ........................... 320/2, 5, 6, 15; 455/89, 90

[56] References Cited

U.S. PATENT DOCUMENTS

| | | | |
|---|---|---|---|
| 4,101,818 | 7/1978 | Kelly, III et al. | 320/2 |
| 4,303,876 | 12/1981 | Kelly, III et al. | 320/2 |
| 4,403,182 | 9/1983 | Yen | 320/2 |
| 4,558,270 | 12/1985 | Liautaud et al. | 320/2 |
| 4,636,702 | 1/1987 | Tonya et al. | 320/2 |
| 4,766,361 | 8/1988 | Pusateri | 320/22 |
| 4,873,479 | 10/1989 | Iimura et al. | 320/2 |
| 5,148,094 | 9/1992 | Parks et al. | 320/2 |
| 5,162,719 | 11/1992 | Tomura et al. | 320/2 |
| 5,229,701 | 7/1993 | Leman et al. | 320/2 |
| 5,233,281 | 8/1993 | Chiang et al. | 320/2 |
| 5,245,266 | 9/1993 | Yuen | 320/2 |

Primary Examiner—Kristine L. Peckman
Attorney, Agent, or Firm—Bucknam and Archer

[57] ABSTRACT

Disclosed is a battery charger having a rack fastened in a casing to hold two horizontal battery-charging contacts and two vertical battery-charging contacts for charging rechargeable batteries of different types, a horizontal sliding frame controlled by a screw to hold down the battery to be charged. The pitch of the horizontal battery-charging contacts as well as the vertical battery-charging contacts is adjustable. The elevation of the horizontal battery-charging contacts is also adjustable.

4 Claims, 3 Drawing Sheets

SIZE ADJUSTABLE BATTERY CHARGER

BACKGROUND OF THE INVENTION

The present invention relates to battery chargers, and more particularly the present invention relates to such a battery charger which is adjustable for charging rechargeable batteries of different types and sizes.

A variety of battery chargers have been proposed for charging different rechargeable batteries. Because different apparatus may use different rechargeable batteries, one may have to prepare various battery chargers for charging rechargeable batteries of different types and sizes.

SUMMARY OF THE INVENTION

The main object of the present invention is to provide a battery charger which can be conveniently adjusted to charge rechargeable batteries of different types and sizes.

According to the preferred embodiment of the present invention, the battery charger comprises a rack consisted of a vertical frame to hold two horizontal contacts and a horizontal frame to hold two vertical contacts, and a horizontal sliding frame controlled by a screw to hold down the battery to be charged. The vertical contacts are used for charging a battery having its charging terminals at the bottom; the horizontal contacts are used for charging a battery having its charging terminals at the back. The pitch of the horizontal battery-charging contacts as well as the vertical battery-charging contacts is adjustable, and the elevation of the horizontal battery-charging contacts is also adjustable. Therefore, the battery charger can be adjusted to charge rechargeable batteries of different types and sizes.

DETAILED DESCRIPTION OF THE PREFERRED EMBODIMENT

Referring to the annexed drawings in detail, a battery charger in accordance with the present invention is generally comprised of a rack 2 fastened inside a base 1.

Figure 1:
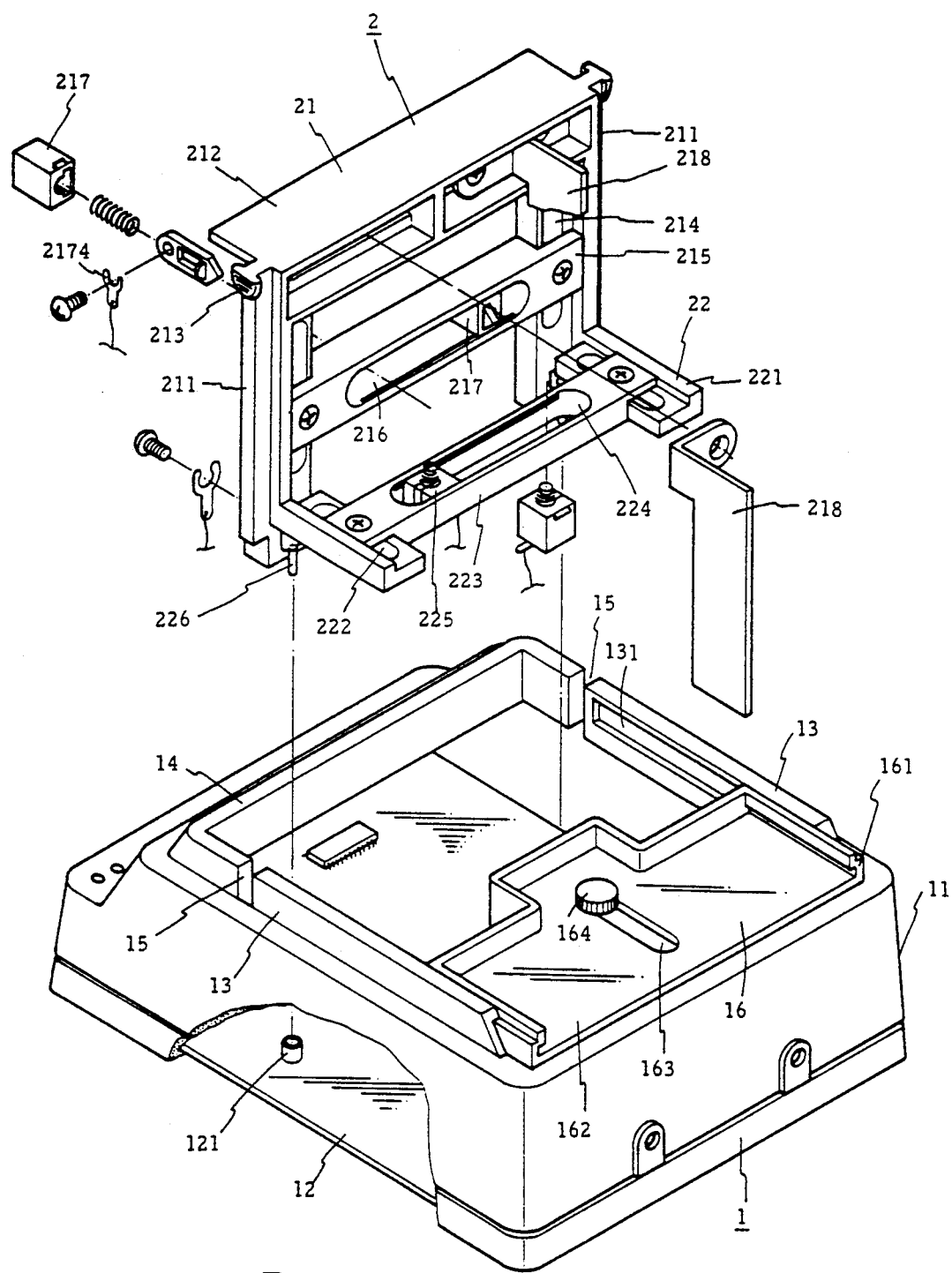
FIG. 1 is a perspective exploded view of a battery charger embodying the present invention.

Referring to FIG. 1, the base 1 comprises a hollow, rectangular casing 11 having a bottom covered with a bottom plate 12 and an open top. The bottom plate 12 is a circuit board, which provides rectifying and voltage dropping functions (this is the known art), having positive and negative output sockets 121. The casing 11 of the base 1 comprises two parallel rails 13 longitudinally disposed on two opposite sides at the top, a fender 14 transversely disposed at one side and spaced from the rails 13 by gaps 15. Each rail 13 has a horizontal groove 131 longitudinally disposed on an inner side. A horizontal sliding frame 16 is made to slide in and out of the rails 13. The horizontal sliding frame 16 comprises two side tongues 161 on two opposite sides thereof respectively inserted in the horizontal grooves 131 of the rails 13, and an elongated slot 163 through a bottom 162 thereof in the middle in parallel with the rails 13. A screw 164 is inserted through the elongated slot 163 on the horizontal sliding frame 16 and threaded into a screw hole (not shown) on the bottom plate 12 in holding down the horizontal sliding frame 16.

The rack 2 comprises a vertical frame 21 and a horizontal frame 22 connected at right angles. The vertical frame 21 is comprised of a horizontal top plate 212 supported above two opposite side posts 211. The horizontal top plate 212 comprises two finger strips 213 respectively extended out of the side posts 211. The side posts 211 fit into the gaps 15 respectively, each having a longitudinal groove 214 on an inner side for sliding a slide 215. The slide 215 has two opposite ends respectively connected to the side posts 211 and allowed to be moved vertically along the longitudinal grooves 214 thereof. An elongated through hole 216 is made on the slide 215 to hold two horizontal contacts 217, which can be slid horizontally in the through hole 216. Two adjustable clamping plates 218 are disposed below the horizontal top plate 212 within the side posts 211 for holding the battery to be charged. The horizontal frame 22 comprises two parallel end bars 221 perpendicularly connected to the side posts 211 at a lower elevation and joined by a cross bar 223. Each end bar 221 has an elongated groove 222, along which the cross bar 223 slides. The cross bar 223 has an elongated through hole 224 to hold two vertical contacts 225, which can be slid in the through hole 224.

Figure 2:
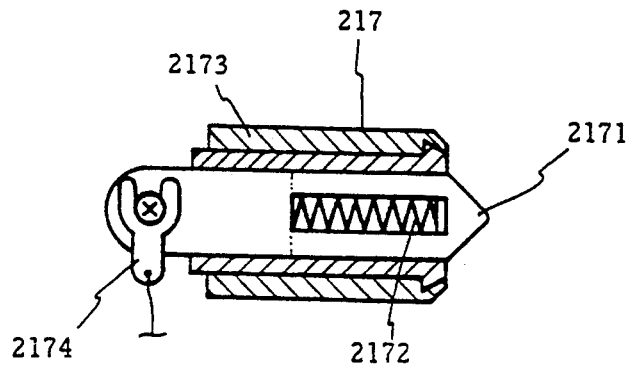
FIG. 2 is a cross section of a horizontal contact according to the present invention.

Referring to FIG. 2, the horizontal contact 217 comprises a charging terminal 2171 retained inside a contact holder 2173 by a spring 2172. A contact plate 2174 is fastened to the charging terminal 2171 by a screw and connected to power supply by an electric wire.

Figure 3:
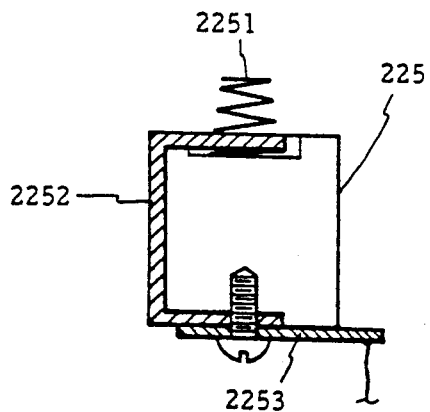
FIG. 3 is a cross section of a vertical contact according to the present invention.
Figure 4:
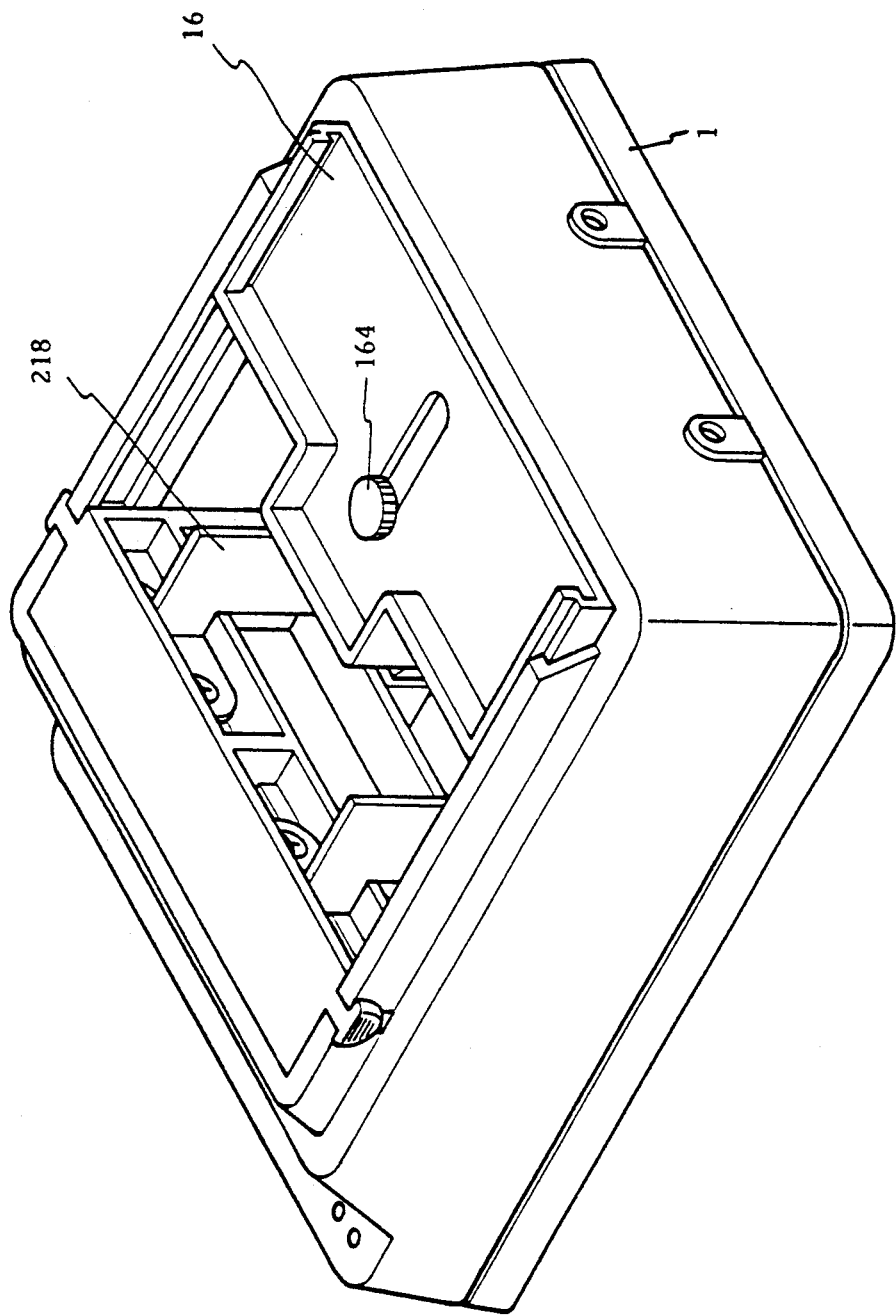
FIG. 4 is a perspective view of the battery charger.

Referring to FIG. 3, the vertical contact 225 comprises a conductive plate 2252 fastened with a spring leaf 2253 connected to power supply by an electric wire, and a conductive spring 2251 connected to the conductive plate 2252 at the top.

Referring to FIG. 1 again, plug pins 226 are made on the vertical frame 21 and horizontal frame 22 of the rack 2 and electrically connected to the horizontal and vertical contacts 217,225 and respectively inserted in the sockets 121.

The aforesaid arrangement allows the battery charger to charger rechargeable batteries of different types and sizes. The vertical contacts 225 are used for charging a battery having its charging terminals at the bottom; the horizontal contacts 217 are used for charging a battery having its charging terminals at the back. When in use, the horizontal or vertical contacts 217 or 225 are moved to the charging terminals of the battery to be charged, then the clamping plates 218 are adjusted to firmly retain the battery in position, and then the horizontal sliding frame 16 is adjusted by the screw 164 to firmly stop the battery in place.

What is claimed is:

1. A size adjustable battery charger comprising:
a rectangular casing having a charging circuit assembly supported above a bottom surface thereof, said charging circuit assembly having positive and negative output sockets, two grooved parallel rails longitudinally disposed on two opposite sides at the top of said casing, a fender transversely disposed relative to said parallel rails at one side of said casing and spaced from each of said parallel rails by a respective gap, a horizontal sliding frame for sliding in and out of said parallel rails and having a centrally disposed elongated slot therethrough, through which a hold-down screw is threadably engaged in said casing to hold said horizontal sliding frame in place; and a rack formed of a horizontal frame connected to a vertical frame and received in said casing, said vertical frame comprising a horizontal top plate supported above two opposite side posts and a slide which is vertically adjustable and connected between said side posts, two horizontal contacts movably fastened in an elongated through hole on said slide and respectively connected to said positive and negative output sockets for charging rechargeable batteries, said horizontal frame comprising two parallel end bars perpendicularly connected to said side posts at a lower elevation and joined by a cross bar, and two vertical contacts movably fastened in an elongated through hole on said cross bar and respectively connected to said positive and negative output sockets.

2. The battery charger of claim 1 wherein each of said horizontal contacts comprises a charging terminal retained inside a contact holder by a spring, said charging terminal being externally fastened to a contact plate by a screw which is connected to a power supply by an electric wire.

3. The battery charger of claim 1 wherein each of said vertical contacts comprises a conductive plate fastened with a spring leaf connected to a power supply by an electric wire, and a conductive spring connected to said conductive plate at the top.

4. The battery charger of claim 1 wherein said vertical frame of said rack comprises two adjustable clamping plates disposed below said horizontal top plate within said side posts for holding a battery to be charged.

* * * * *